United States Patent
Bell et al.

(10) Patent No.: US 7,605,200 B2
(45) Date of Patent: Oct. 20, 2009

(54) BORON LOADED SCINTILLATOR

(75) Inventors: Zane William Bell, Oak Ridge, TN (US); Gilbert Morris Brown, Knoxville, TN (US); Leon Maya, Knoxville, TN (US); Frederick Victor Sloop, Jr., Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 168 days.

(21) Appl. No.: 11/392,397

(22) Filed: Mar. 28, 2006

(65) Prior Publication Data

US 2009/0236530 A1 Sep. 24, 2009

Related U.S. Application Data

(60) Provisional application No. 60/665,693, filed on Mar. 28, 2005.

(51) Int. Cl.
*C08K 5/35* (2006.01)

(52) U.S. Cl. .................. 524/95; 524/105; 524/140; 528/5; 250/370.11; 250/395; 250/459.1; 250/462.1; 252/301.17

(58) Field of Classification Search .............. 528/5; 524/140, 95, 105; 250/370.11, 395, 459.1, 250/462.1; 252/301.17
See application file for complete search history.

(56) References Cited

U.S. PATENT DOCUMENTS

| 5,110,500 | A | 5/1992 | Walker |
| 5,420,959 | A | 5/1995 | Walker et al. |
| 5,969,072 | A | 10/1999 | Keller et al. |
| 6,992,296 | B2 | 1/2006 | Okada et al. |

OTHER PUBLICATIONS

NUCL, Division of Nuclear Chemistry and Technology, Anaheim abstract NUCL 10, 2004.*
Bell, et al. "Organic scintillators for neutron detection", Proceedings of SPIE, 2003, vol. 4784, pp. 150-164.

* cited by examiner

*Primary Examiner*—Margaret G Moore
(74) *Attorney, Agent, or Firm*—Novak Druce + Quigg LLP; Gregory A. Nelson; Gregory M. Lefkowitz

(57) ABSTRACT

A scintillating composition for detecting neutrons and other radiation comprises a phenyl containing silicone rubber with carborane units and at least one phosphor molecule. The carborane units can either be a carborane molecule dispersed in the rubber with the aid of a compatiblization agent or can be covalently bound to the silicone.

19 Claims, 2 Drawing Sheets

BORON LOADED SCINTILLATOR

This application claims the benefit of and incorporates by reference in its entirety Provisional Application No. 60/665,693 entitled "BORON-LOADED SCINTILLATOR" filed on Mar. 28, 2005.

STATEMENT REGARDING FEDERALLY SPONSORED RESEARCH

The United States Government has certain rights in this invention pursuant to Contract No. DE-AC05-00OR22725 between the United States Department of Energy and UT-Battelle, LLC.

FIELD OF THE INVENTION

The invention relates to a boron loaded scintillators and their use for detecting neutrons.

BACKGROUND OF THE INVENTION

Neutron detection depends on the analysis of energetic products formed by interactions between sensitizer nuclei and incident neutrons. Fast neutrons are normally detected using actinide sensitizers coated inside fission chambers and hydrogen to measure the elastic scattering of protons. For slow neutrons, other materials are attractive, for example $^3$He or $BF_3$ in gas filled tubes, $^6$Li-loaded glass, boron or lithium lined gas chambers, and organic and inorganic scintillators. Thermal neutron detection typically requires the conversion of target nuclei into a detectable particle. The most used reaction is that of the direct conversion by reaction with a neutron of $^{10}$B to $^7$Li and alpha particles. Among the organic scintillators boron-loading is the most common method of sensitization and this is usually accomplished by dissolution of an organic boron compound into a polyvinyltoluene matrix.

In the early 1990's silicones were first investigated as a replacement for polyvinyltoluene in scintillators as silicones are also very robust in high radiation fields, and exposure of up to 10 megarads can be tolerated. Unlike polyvinyltoluene, yellowing does not occur after absorbing megarad doses of neutrons. As silicones are elastomer rather than a plastic, no crazing and cracking due to residual stresses will occur. Another attractive features of silicones for scintillators is that the rubber can be cast in any shape or form and are typically heat resistant to 200° C.

Carboranes have been dissolved into silicone rubber to produce centimeter-thick disks that were clear and were examined as thermal neutron detectors. Carboranes is a cluster composed of boron and carbon atoms. Like many of the related boranes, these clusters are polyhedra. Carboranes have the chemical formula $C_2B_{10}H_{12}$ and exist in three isomeric forms. As each molecule contains ten boron atoms their use as scintillation targets is desirable. Unfortunately, the solubility of the carboranes in silicone is significantly limited and the volatility of the carboranes results in sublimation of the carboranes from the silicone rubber, which ultimately rendering the rubber insensitive to thermal neutrons.

The incorporation of a carborane in a silicone polymer backbone is disclosed in Keller et al. U.S. Pat. No. 5,969,072 for use as ceramic or thermostet polymeric precursors. These carborane containing silicone polymers have been shown to have good thermo-oxidative stability.

SUMMARY OF THE INVENTION

A scintillating composition for detecting radiation is a phenyl containing silicone rubber that has carborane units associated with the silicone rubber and at least one phosphor molecule. The phenyl content of the rubber results from phenylmethylsiloxy or diphenylsiloxy repeating units in the cross-linked polysiloxane. The carborane units can be part of a siloxane repeating unit in the rubber or be homogeneously dispersed carborane in the rubber where a compatiblization agent, such as tributyl phosphate is used. The boron content of the composition should be greater than 3.5% and is preferably greater than 5.5%. The scintillating composition can be a rubber of any shape and can be in the form of a fiber.

A method to detecting radiation involves the use of the scintillation composition of a phenyl containing silicone rubber that has carborane units associated with the rubber and at least one phosphor molecule, where the composition is exposed to the radiation causing the emission of light from the phosphor molecule when the radiation is absorbed.

DETAILED DESCRIPTION OF THE INVENTION

Figure 1:
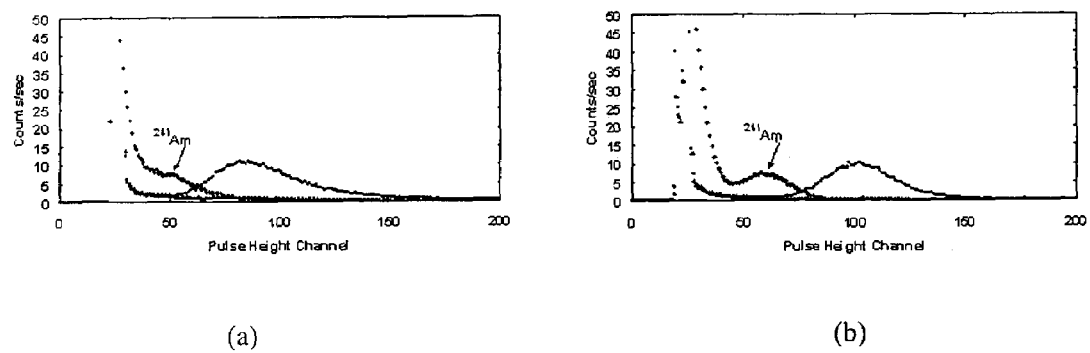
FIG. 1 shows (a) a pulse height spectrum of a 5% by weight $^{nat}$B containing carborane in a phenyl silicone rubber with a 29.5% by weight phenyl content using a heavily moderated Am—Li meutron source as monitored by the PPO emission peak at 375 nm and (b) a pulse height spectrum for a carborane in a phenyl silicone rubber with 5% by weight $^{nat}$B and 29.5% by weight phenyl content where dimethyl POPO is used as the secondary phosphor with an emission peak at 415 nm with the primary phosphor PPO.

A silicone-based scintillator composition for the detection of radiation according to the present invention comprises a carborane containing rubber having a heat resistance to 200° C. and robust in a high radiation field. The rubber can be in any suitable shape The rubber is constructed from a carborane bound organosilicone rubber which contains a large number of phenyl groups. The scintillator composition also includes an organic phosphor for absorbing energy from the phenyl groups of the silicone rubber after neutron absorption to produce photons of light which can be detected by a photosensor. There are ten boron atoms per carborane unit to effectively interact with neutrons or other radiation. In general, the effectiveness of the scintillator composition increases with an increase in the boron content and an increase of the phenyl content of the composition.

The organic phosphor is generally compatible with the phenylsilicone. Preferred phosphor are 2,5-diphenyloxazole (PPO) which emits at 360-380 nm, 1,3,5-triphenyl-2-pyrazoline (TPP) which emits at 410 nm, and 1,4-bis(4-methyl-5-phenyloxazol-2-yl)benzene dimethyl (POPOP) which emits at 427 nm. The structure of these phosphors are given below as structures (1) through (3). The phosphor can be used in combination where one is the primary phosphor, for example PPO, to accept energy from the phenyl groups of the silicone and a secondary scintillator, for example dimethyl POPOP, to shift the wavelength of the photons from that of the primary phosphor to photons which more closely match that detected by the photo multiplier tube or other detector and move the wavelength away from the smaller wavelengths where absorption by the phenyl groups occur.

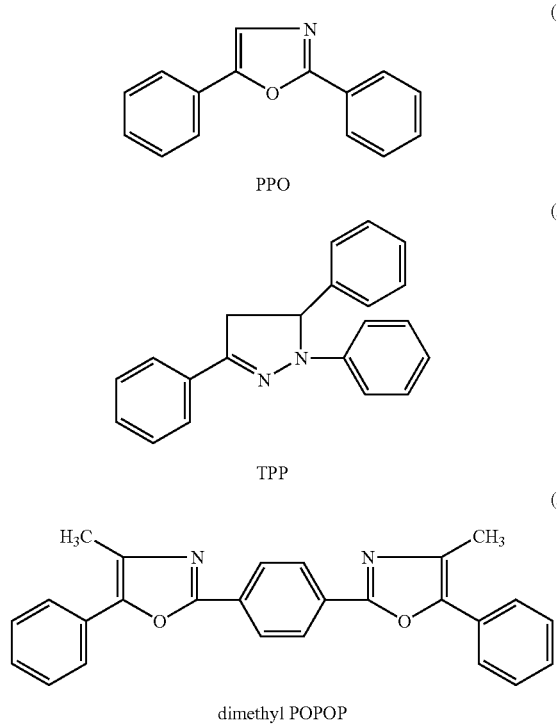

The carborane unit can be incorporated in the silicone in at least two manners. One is by the inclusion of carborane molecules into phenylsilicone network precursor by the use of a compatibilizing agent. This is illustrated in a non-limiting embodiment, Example 1, below. The other method is by incorporation of carborane units into the silicone rubber where the carborane unit is covalently bound within the silicone polymer. One method of incorporating carborane units into a siloxane polymer is disclosed in Keller et al. U.S. Pat. No. 5,969,072, which is incorporated by reference. This method is illustrated in a non-limiting embodiment, Example 2, below. Other methods of preparing a carborane containing silicone monomer which can be incorporated as a repeating unit into a silicone can be used to produce the composition of the invention.

Though more limited with respect to the maximum loading of boron that can be achieved compared to the bonding a carborane group in a silicone rubber precursor, the inclusion of carborane with a compatabilization agent can overcome solubility problems of carboranes in siloxanes. Compatabilization agent are co-solvents for the silicones and carboranes that enhance the mixing but also have sufficient thermal and radiation stability to be included in the scintillator. An efficient compatabilization agent is tributylphosphate which is stable to 200° C. in the silicone rubber domain.

An alternate method to achieve a carborane bound phenylsilicone rubber according to the invention begins by the formation of a lithiocarborane by the reaction of carborane with butyllithium. The resulting dilithiocarborane is mixed with about two equivalents of methylphenyldichlorosilane to yield 1,7-bis-(methylphenylchlorosilyl)carborane. This monomer can then be polymerized by the addition of water to form silanol terminated polymers with a relatively low degree of polymerization. The silanol terminated polymer can then be capped by the addition of an appropriate capping agent to yield hydro or vinyl termintated polymers as shown in Equation 1. Upon mixing of one or both of the hydro or vinyl termintated polymers with a required amount of a tri or poly hydro and/or vinyl containing silane or siloxane, such as methylhydrosiloxane-phenylmethylsiloxane copolymer-hydride terminated, at approximately a 1:1 vinyl to hydride ratio, or any other ratio where gelation can occur, a cured rubber can be achieved with a boron level of up to about 37% by weight.

Equation 1
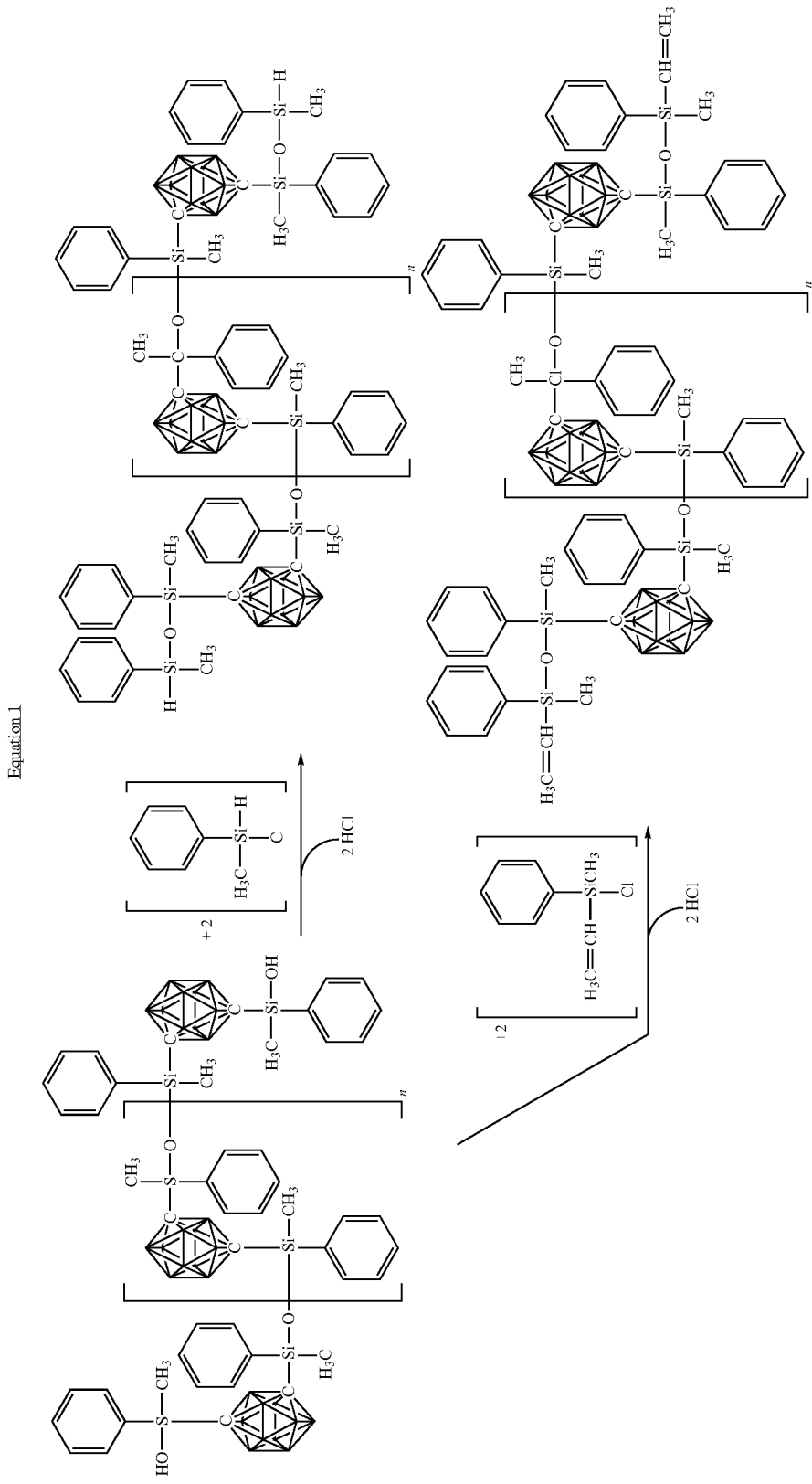

Other methods of preparing the carborane containing polymers and curing the rubbers can be carried out. These methods can exploit well known methods of preparing precursors containing chloro, alkycarboxy, alkoxy, amino, or amido functionality on silicon and their subsequent condensation with water or silanol groups to achieve the desired carborane containing phenylsilicone rubbers. Although, some details of the detailed microstructure of the rubber will differ from the embodiments demonstrated in examples, the necessary features of the rubber of the carborane to capture the neutrons and the phenyl groups to harvest the kinetic energy, which can then be transferred to the organic wave shifters, the scintillators, to give a light output at a higher wavelength.

The effectiveness of a scintillator of the present invention is illustrated by the neutron signature given by a pulse height analysis. FIG. 1 shows the effect of a second phosphor to the silicone. The boron capture reaction results in the emission of an alpha particle and Li-7 ion sharing 2.31 or 2.78 MeV of energy as Li nucleuse may be created in its ground state or its first excited state. For neutron energies up to approximately 100 keV, the two reactions occur in the ratio of 15:1, with the 2.31 MeV reaction being the dominant one. Since both ions stop in the scintillator, this entire energy is available to generate light. FIG. 1 show pulse height spectra obtained with silicone samples mounted on photomultipier tubes. The scintillator was exposed to the gamma rays from Am-241 (59.5 keV) and to thermal neutrons. Gamma rays interact primarily via the photoelectric effect (ejecting electrons with energy essentially that of the gamma ray) and by the Compton effect (ejecting electrons having a continuum of energies rather than a single energy). The spectra each show a structure characteristic of the 59.5 keV Am-241 gamma, and this structure is identified. The spectra also show a peak at approximately twice the pulse height (i.e. approximately 110 keV), demonstrating that it is caused by neutrons. The thickness of the samples was too small for true 110 keV gamma rays to produce a peak.

FIG. 1 also show the effects of adding a small amount (<0.1%) dimethyl POPOP to the silicone. The position of each peak is indicative of the amount of light reaching the photomultiplier. In the figure on the left the neutron peak is near channel 80. This is a consequence of the scintillator PPO producing light in a band centered near 375 nm, a wavelength that is not near those wavelengths most efficiently converted by the photomultiplier and which are slightly absorbed by silicone. DimethylPOPOP absorbs light with wavelengths between 360 and 380 nm and re-emits it in a band centered at 415 nm. The intimate mixture of PPO and dimethylPOPOP in the silicone permits efficient conversion from 375 nm to 415 mm, with an increase in the amount of light reaching the photomultiplier and efficiency of the conversion from light to electrical signal. The right-hand figure shows that the overall process is about 40% more efficient with the addition of dimethylPOPOP.

Figure 2:
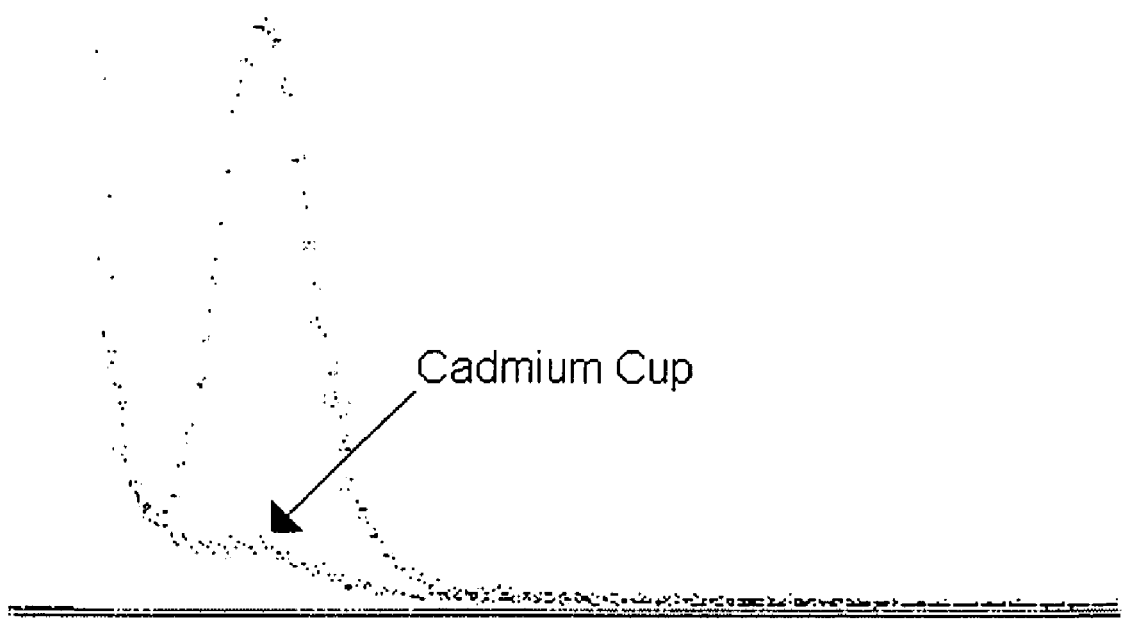
FIG. 2 shows two superimposed spectra for an 18% by weight $^{nat}$B containing carborane in a phenyl silicone rubber using PPO and TPP as the primary and secondary phosphors where one spectrum was recorded in a cadmium cup and the other was recorded in the absence of the cup.

FIG. 2 shows spectra obtained by mounting a silicone disk, 2.5 cm in diameter and 3 mm thick, containing 18% natural boron by weight on a photomultiplier tube. The photomultiplier converts light quanta to electrical current. The photomultiplier was connected to an amplifier that converted the current pulses corresponding to scintillation events to voltages whose amplitudes were proportional to the number light quanta emitted by the scintillator in response to ionization events in the scintillator. The voltage was converted to a digital value by an analog-to-digital converter (ADC) interfaced to a computer. The computer's software accumulated a histogram of the number of times each ADC value was observed and produced the graph shown in FIG. 2. The x-axis represents the amplitude of the light pulses, the y-axis represents the number of pulses at each x-value.

The two spectra are overlayed in FIG. 2 for comparison. In the one marked "cadmium cup" the scintillator/photomultiplier was inserted into a thin metallic cadmium cup and the entire assembly was inserted into the moderator of an AmLi neutron source. Cadmium is an efficient absorber of thermal neutrons and prevents them from reaching the scintillator to interact with the boron. Consequently, only fast neutrons and those thermal neutrons that manage to avoid the cadmium (the cup is open at the back to accommodate the scintillator and photomultiplier) are able to reach the scintillator. The unmarked spectrum with the prominent peak was obtained from the same sample, using the same electronics as the "cadmium cup" spectrum, with the only difference being the removal of the cup. Since there was no neutron shield, the flux of thermal neutrons was able to reach the scintillator and produce the peak. This figure demonstrates that the scintillator is sensitive to neutrons.

EXAMPLES

It should be understood that the Examples described below are provided for illustrative purposes only and do not in any way define the scope of the invention.

Example 1

Tributylphosphate was dried over magnesium sulfate and 1.1 g was used to dissolve 0.5 g of m-carborane to give a clear solution that contained 23.4% boron by weight. A 970 mg portion of the solution was added to a mixture of 75 mg of 2,5-diphenyloxazole (PPO), 5 mg of 1,3,5-triphenyl-2-pyrazoline (TPP), 4.6 g of 92% vinyl terminated (75-78%) dimethyl (22-25%) diphenylsiloxane copolymer and 0.4 g of hydride terminated (45-50%) methylhydro (55-55%) phenylmethylsiloxane copolymer. Upon addition of 2 microliters of a platinum divinylsiloxane catalyst the mixture slowly cured into a rubber with 5.4% boron by weight.

Example 2

A 2.1 g portion of 1,7-bis-(3-chloro-1,1,3,3-tetramethyldisiloxan-yl)carborane, Dexsil 400 monomer, was diluted to give a 10 mL solution in dry tetrahydrofurane and cooled in an ice bath. To this stirred mixture was added dropwise 9.0 mL of a 1.0 M vinylmagnesium bromide solution in tetrahydrofuran. After warming to room temperature stirring was stopped after 2 hours. Upon standing overnight a crystalline precipitate formed. Diethyl ether was added to the suspension and the suspension washed with saturated ammonium chloride solution ad subsequently dried with sodium sulfate. The mixture was then filtered through a silica column. The product was washed from the column with hexane to give a colorless oil which upon evaporation of the solvent yielded 1.65 g of the desired 1,7-bis-(3-vinyl-1,1,3,3-tetramethyldisiloxan-yl)carborane whose structure was verified by an IR spectrum.

A 2.0 g portion of 1,7-bis-(3-chloro-1,1,3,3-tetramethyldisiloxan-yl)carborane, Dexsil 400 monomer, was placed in one side of a fritted glass filter in a two-compartment flask. To the other side of the flask was added 263 mg of lithium borhydride. To the side of the flask with the Dexsil monomer was added 10 mL of diethylether and to the side containing the lithium borhydride was added 10 mL of diethylether and 5 mL of dry tetrahydrofuran. The contents of the flask were frozen using a liquid nitrogen bath and the flask was evacuated. Upon warming to room temperature the lithium borhydride solution was filtered into the carborane solution. The mixture was stirred for one hour producing a precipitate. The solution was then filtered to the compartment that originally contained the lithium borhydride to dissolve any remaining lithium borhydride. The mixture was again filtered to the other compartment and the volume of the solution was reduced to approximately two thirds of the original volume to remove any $B_2H_6$. Water was carefully added to destroy any remaining boron hydride compounds and the resulting solution was filtered over bentonite which was washed with hexane. The solvents were removed at reduced pressure to produce 1.43 g of 1,7-bis-(3-hydro-1,1,3,3-tetramethyldisiloxan-yl)carborane whose structure was verified by an IR spectrum.

The two carborane monomers 1,7-bis-(3-hydro-1,1,3,3-tetramethyldisiloxan-yl)carborane and 1,7-bis-(3-vinyl-1,1,3,3-tetramethyldisiloxan-yl)carborane were then combined with various quantities of commercially available methylhydrosiloxane-phenylmethylsiloxane copolymer-hydride terminated and dimethylsiloxane-diphenylsiloxane copolymer-divinyl terminated to yield siloxane mixtures with boron contents of 5 to 18% by weight. Typically, PPO (1.5% by weight) and TPP (0.1% by weight) were added to form a pre-cured scintillator. As needed the mixture could be warmed to 60° C. to facilitate dissolution of the PPO and TPP in the mixture. Upon addition of platinum divinylsiloxane catalyst at room temperature the mixture solidified into a rubber.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

We claim:

1. A scintillating composition for detecting radiation, comprising:
    a phenyl containing silicone rubber;
    carborane units associated with said silicone rubber;
    at least one phosphor molecule; and a compatiblization agent to incorporate said carborane units, wherein said compatiblization agent is tributyl phosphate.

2. The composition of claim 1, wherein a boron concentration by weight of said scintillating composition is at least 3.5%.

3. The composition of claim 1, wherein the boron concentration by weight of said composition is at least 5.5%.

4. A scintillating composition for detecting radiation, comprising:
    a carborane bound phenylsilicone rubber, and
    at least one phosphor molecule, wherein said carborane bound phenylsilicone rubber comprises:
        at least one siloxane unit comprising a carborane covalently bonded to a silicon atom, and
        at least one phenyl containing siloxane unit selected from the group consisting of a methylhydrosiloxane-phenylmethylsiloxane copolymer, a dimethylsiloxane-diphenylsiloxane copolymer, and a combination thereof.

5. The composition of claim 4, wherein said carborane bound phenylsilicone rubber comprises at least one siloxane unit comprising 1,7-bis(1,1,3,3-tetramethyldisiloxan-yl)carborane.

6. The composition of claim 4, wherein said carborane bound phenylsilicone rubber comprises both a methylhydrosiloxane-phenylmethylsiloxane copolymer siloxane unit and a dimethylsiloxane-diphenylsiloxane copolymer siloxane unit.

7. The composition of claim 6, wherein said carborane bound phenylsilicone rubber further comprises at least one siloxane unit comprising 1,7-bis(1,1,3,3-tetramethyldisiloxan-yl)carborane.

8. The composition of claim 4, wherein a boron concentration by weight of said scintillating composition is at least 3.5%.

9. The composition of claim 4, wherein the boron concentration by weight of said composition is at least 5.5%.

10. The composition of claim 4, wherein said composition is formed into fibers.

11. A method of forming a scintillating composition for detecting radiation, comprising:
    forming a phenyl and carborane containing silicone rubber according to claim 4 by polymerizing a mixture comprising:
        (a) a carborane comprising siloxane precursor terminated with a hydride functionality;
        (b) a carborane comprising siloxane precursor terminated with a vinyl functionality;
        (c) at least one phosphor molecule; and
        (d) at least one phenyl containing siloxane unit selected from the group consisting of a methylhydrosiloxane-phenylmethylsiloxane copolymer, a dimethylsiloxane-diphenylsiloxane copolymer, and a combination thereof.

12. The method of claim 11, wherein said carborane comprising siloxane precursor terminated with a hydride functionality is 1,7-bis-(3-hydro-1,1,3,3-tetramethyldisiloxan-yl)carborane.

13. The method of claim 11, wherein said carborane comprising siloxane precursor terminated with a vinyl functionality is 1,7-bis-(3-vinyl-1,1,3,3-tetramethyldisiloxan-yl)carborane.

14. The method of claim 11, wherein (d) comprises both a methylhydrosiloxane-phenylmethylsiloxane copolymer and dimethylsiloxane-diphenylsiloxane copolymer.

15. The method of claim 14, wherein said carborane comprising siloxane precursor terminated with a hydride functionality is 1,7-bis-(3-hydro-1,1,3,3-tetramethyldisiloxan-yl)carborane.

16. The method of claim 14, wherein said carborane comprising siloxane precursor terminated with a vinyl functionality is 1,7-bis-(3-vinyl-1,1,3,3-tetramethyldisiloxan-yl)carborane.

17. The method of claim 14, wherein said carborane comprising siloxane precursor terminated with a hydride functionality is 1,7-bis-(3-hydro-1,1,3,3-tetramethyldisiloxan-yl)carborane; and wherein said carborane comprising siloxane precursor terminated with a vinyl functionality is 1,7-bis-(3-vinyl-1,1,3,3-tetramethyldisiloxan-yl)carborane.

18. A method of detecting radiation, comprising the steps of:
    providing a scintillating composition for radiation detection comprising a scintillating composition for radiation detection of claim 1 or a scintillating composition for radiation detection of claim 4; and
    disposing said composition in the path of a beam of radiation, wherein said phosphor molecule emits light when said composition absorbs said radiation.

19. The method of claim 18, further comprising detecting light emitted by said phosphor molecule using a photosensor.

* * * * *